(12) United States Patent
Princivalle (10) Patent No.: US 12,146,445 B2
(45) Date of Patent: Nov. 19, 2024

(54) METHOD AND SYSTEM FOR REGULATING THE THRUST OF AN AIRCRAFT TURBOMACHINE

(71) Applicant: SAFRAN AERO BOOSTERS, Herstal (BE)

(72) Inventor: Rémy Henri Pierre Princivalle, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/040,583

(22) PCT Filed: Aug. 10, 2021

(86) PCT No.: PCT/EP2021/072279
§ 371 (c)(1),
(2) Date: Jun. 22, 2023

(87) PCT Pub. No.: WO2022/034083
PCT Pub. Date: Feb. 17, 2022

(65) Prior Publication Data
US 2023/0366358 A1    Nov. 16, 2023

(30) Foreign Application Priority Data

Aug. 14, 2020    (BE) .................................. 2020/5570

(51) Int. Cl.
*F02C 9/58* (2006.01)
*F02C 9/22* (2006.01)

(52) U.S. Cl.
CPC .................. *F02C 9/58* (2013.01); *F02C 9/22* (2013.01); *F05D 2260/70* (2013.01)

(58) Field of Classification Search
CPC ...... F02C 9/20; F02C 9/58; F02C 9/54; F02K 1/66
See application file for complete search history.

(56) References Cited

U.S. PATENT DOCUMENTS

| | | | | |
|---|---|---|---|---|
| 3,011,310 A | * | 12/1961 | Longstreet | F02K 3/00 60/791 |
| 3,528,752 A | * | 9/1970 | Chilman | F01D 7/00 416/157 R |
| 3,932,058 A | * | 1/1976 | Harner | F02K 1/66 60/236 |
| 4,080,785 A | | 3/1978 | Koff et al. | |

(Continued)

OTHER PUBLICATIONS

International Search Report mailed Dec. 3, 2021, issued in corresponding International Application No. PCT/EP2021/072279, filed Aug. 10, 2021, 6 pages.

(Continued)

*Primary Examiner* — Gerald L Sung
(74) *Attorney, Agent, or Firm* — CHRISTENSEN O'CONNOR JOHNSON KINDNESS PLLC (57) ABSTRACT

A method and system control the thrust of an aircraft turbomachine having a high bypass ratio by direct action on a variable-pitch system. The variable-pitch system varies the pitch of the vanes of a stator of a low-pressure compressor for the open-loop control of the thrust of the turbomachine. The method also provides closed-loop control of the pitch of the blades of a propeller based on a rotational speed of the propeller.

8 Claims, 4 Drawing Sheets

(56) References Cited

U.S. PATENT DOCUMENTS

| | | | |
|---|---|---|---|
| 6,439,850 B1* | 8/2002 | McCallum | F04D 29/063 |
| | | | 416/144 |
| 2015/0184535 A1* | 7/2015 | Dougherty | F04D 29/563 |
| | | | 415/150 |
| 2016/0061052 A1* | 3/2016 | Suciu | F02K 3/072 |
| | | | 29/889.21 |
| 2017/0218841 A1 | 8/2017 | Nestico et al. | |
| 2018/0231016 A1* | 8/2018 | Power | F04D 19/026 |
| 2020/0088108 A1 | 3/2020 | Klein et al. | |
| 2021/0025338 A1* | 1/2021 | Des Roches-Dionne | |
| | | | F02C 9/28 |

OTHER PUBLICATIONS

Written Opinion mailed Dec. 3, 2021, issued in corresponding International Application No. PCT/EP2021/072279, filed Aug. 10, 2021, 7 pages.

* cited by examiner

METHOD AND SYSTEM FOR REGULATING THE THRUST OF AN AIRCRAFT TURBOMACHINE

BACKGROUND

Embodiments of the present disclosure relate to a method and a system for regulating the thrust of an aircraft turbomachine.

To increase the efficiency of an aircraft turbomachine, it is known to increase the size of its propeller or propellers (ducted or not) while mechanically and/or aerodynamically adapting the turbomachine.

This is in particular true for double-flow turbojet engines (also referred to as "turbofans"), for example the turbojet engines referred to as "UHBR" (Ultra High Bypass Ratio), where the ducted propeller, usually referred to as a "fan", can be of variable pitch setting and large size to absorb and accelerate a large air flow rate.

This is also the case for "open rotor" thrusters (commonly referred to as "open rotor", "propfan" or "un-ducted fan"), e.g. the thrusters referred to as "USF" (Un-ducted Single Fan, comprising one single propeller) or "CROR" (Contra-Rotating Open Rotor, open rotor with two contra-rotating propellers) which aim to combine the performance of a turbojet engine and a turboprop engine, and comprising one or two large, un-ducted, high-speed propulsion propellers.

In both cases, the "bypass ratio", i.e. the ratio between the cold air flow (referred to as "secondary flow") that is accelerated by the propeller or the propellers without passing through the combustion chamber of the aircraft turbomachine, and the hot air flow (referred to as "main flow") that passes through the latter, is large, usually equal to 20 or more. This reduces the fuel consumption.

It is known to regulate the thrust of a standard aircraft turbomachine, which has a lower bypass ratio, by acting on the rotational speed of the fan in the case of the double-flow turbojet engines, or on the pitch setting of the blades of the propeller or propellers and the flow rate of fuel injected into the combustion chamber in the case of the turboprop engines. These methods are also extended to high bypass ratio aircraft turbomachines, for example in the document US 2020/088108 A1. However, they could be improved for such aircraft turbomachines.

SUMMARY

It is an object of the disclosure to provide an accurate and efficient method for regulating the thrust of high bypass ratio aircraft turbomachines such as those introduced above. In particular, in the context of the disclosure, the aircraft turbomachine comprises:
- (at least) one propeller comprising a plurality of blades,
- a blade variable pitch setting system for varying the pitch of the blades;
- and, successively, along an engine axle of the turbomachine:
  - a low-pressure compressor comprising at least one straightener (also referred to as "stator" and/or "stator vane (assembly)") equipped with a vane variable pitch setting system configured to change an orientation of vanes of the straightener,
  - a high-pressure compressor,
  - a combustion chamber,
  - at least one turbine, preferably a low-pressure turbine and a high-pressure turbine.

This aircraft turbomachine has a preferred bypass ratio of at least 20, optionally at least 30. It preferably comprises a mechanical coupling between this at least one propeller and the low-pressure compressor. The mechanical coupling comprises a shaft (referred to as "low-pressure shaft") connecting the at least one propeller and the low-pressure compressor, either directly or via an interposed reducer, such that the rotational speeds of the at least one propeller and the low-pressure compressor are proportional. For the sake of brevity, the terms "the propeller" and "the straightener" will be used hereafter to refer to "the (at least one) propeller" and "the at least one straightener" respectively.

It may seem legitimate to attempt to exploit known regulation methods for lower bypass ratio aircraft turbomachines. However, none of them satisfactorily fulfils the object of the disclosure. On the one hand, since the propellers of these turbomachines are large, their inertia is also large, which makes their variation in regime rather slow. It therefore seems complex to implement a regulation of the thrust of the turbomachine by acting on the rotational speed of these propellers. On the other hand, there is a significant inaccuracy in the pitch setting of the blades of such a propeller, which leads to too much uncertainty about the operating point of the low-pressure compressor between its low efficiencies and its line referred to as "for pumping" (and/or "stalling"), the efficiency of the latter, and therefore of the turbomachine, being penalized.

For this reason, the present disclosure proposes a method for regulating the thrust of such an aircraft turbomachine comprising the following steps:
- (i) varying a pitch setting of vanes of the straightener by means of the vane variable pitch setting system to regulate the thrust of the turbomachine in an open loop;
- (ii) regulating a pitch setting of blades of the propeller in a closed loop based on a rotational speed of the propeller, by means of the blade variable pitch setting system.

This method for regulation is both accurate and efficient. It ingeniously departs from adaptations of existing solutions for lower bypass ratio aircraft turbomachines to address the technical impediments that these solutions raise. It proposes to regulate the thrust of the turbomachine by a direct action on the vane variable pitch setting system for varying the pitch of the vanes of the straightener instead of acting on the rotational speed or on the pitch setting of the propeller. The range of variation of the pitch setting of vanes of the straightener, preferably between 0 and 60 degrees, more preferably between 0 and 30 degrees, is greater than that of the pitch setting of the blades of the propeller so that for a same absolute accuracy (ΔC), a better relative accuracy on the pitch setting (i.e. the ratio between ΔC and the size of this range of variation) can be achieved. In addition, the thrust selection implemented in this way has the advantage of being particularly reactive, as it is based on the air flow rate within the compressors, which has a lower inertia. In parallel, and advantageously, the method proposes a control on the rotational speed of the propeller by a regulation of the pitch setting of the blades of the propeller in a closed loop. In this way, the blade pitch setting system for varying the pitch of the blades of the propeller is not used to regulate the thrust, but rather to control the rotational speed of the propeller, which, due to its high inertia, will preferably be maintained at a rotational speed corresponding to the image of the pitch setting of vanes of the straightener by an essentially constant or affine function associated with each steady regime. Preferably, the pitch setting of all the vanes of the straightener is configured to being varied in the step (i) to regulate the thrust of the turbomachine. Preferably, the pitch setting of all the blades of the propeller is regulated in the step (ii).

For the sake of completeness, it is recalled that an "open loop regulation (or control)" of a system is a regulation that does not take into account the response of the system, and a "closed loop regulation (or control)" is a regulation that takes into account such a response. In the case of the present disclosure, a thrust selection is directly translated into an action on the vane variable pitch setting system for varying the pitch of vanes of the straightener, while the pitch setting of blades of the propeller is regulated on the basis of its rotational speed, this regulation involving a regular measurement of the rotational speed of the propeller, preferably to ensure its compliance with a given steady regime.

It should also be noted that the use of the verb "to comprise" and its variants, as well as its conjugations, in this document can in no way exclude the presence of elements other than those mentioned. The use in this document of the terms "a", "one", "at least one" or "the" to introduce an element does not preclude the presence of a plurality of these elements. The terms "first", "second", "third" and so on are used exclusively to differentiate between similar elements, without implying any order between these elements.

The method according to the disclosure is preferably executed in a steady regime. In particular, according to a preferred embodiment of the disclosure, the method further comprises a step (0) which precedes the steps (i) and (ii):
 (0) selecting a steady regime for the aircraft turbomachine;
 the pitch setting of blades of the propeller being then regulated in the step (ii) based on the steady regime selected in the step (iii).

The steady regime is preferably chosen from a list of regimes known to a person skilled in the art according to different phases of flight such as "Take-off", "Cruise" and "Reverse". Each steady regime is thus preferably associated with regulating parameters governing the step (ii) (and/or the step (iii) which will be introduced later).

According to a preferred embodiment of the present disclosure, the pitch setting of blades of the propeller is regulated in the step (ii) so that the rotational speed of the propeller corresponds to a first mathematical function of the pitch setting of vanes of the straightener, the first function depending on the steady regime selected in the step (0). In other words, each steady regime is previously associated with such a first function on the basis of which the regulation of the step (ii) will be performed. Preferably, for each of the steady regimes considered, this first function is a constant or essentially constant function so that the step (ii) allows to maintain a constant or essentially constant rotational speed of the propeller, thus taking into account the inertia of the propeller due to its large size, without any negative impact on the efficiency of the turbomachine or on the effectiveness of the regulation of its thrust. In this case, this constant or essentially constant rotational speed (which therefore corresponds to the choice of such a first function) is preferably determined beforehand for each steady regime which can be selected in the step (0). Alternatively, and without departing from the scope of the disclosure, for each steady regime, this first function can be chosen as a bijective monotonic function, preferably affine. In the case of an "affine function", i.e. a function f of the form $f(\theta)=a\theta+b$ where a and b are coefficients and $\theta$ is a variable (the pitch setting of vanes of the straightener, in this case), a pair of coefficients (a, b) is preferably determined beforehand for each steady regime. In combination, it may also be envisaged that steady regimes are associated with a first bijective, preferably affine, monotonic function and other such steady regimes are associated with a first constant or essentially constant function.

According to a much preferred embodiment of this disclosure, the method further comprises the following step:
 (iii) regulating a flow rate of fuel injected into the combustion chamber in a closed loop based on a ratio of reduced rotational speeds of the high and low-pressure compressors.

Preferably, when the method comprises the above-mentioned step (0), the flow rate of fuel injected into the combustion chamber is regulated in the step (iii) on the basis of the steady regime selected in the step (0).

It is well known to a person skilled in the art that the "reduced rotational speed" of a compressor (hereinafter referred to as N1R and N2R for the low and high-pressure compressors respectively) preferably corresponds to the quotient of the actual rotational speed of the compressor (hereinafter referred to as N1 and N2 for the low and high-pressure compressors respectively) and the square root of the temperature at its inlet (hereinafter referred to as T2 and T25 for the low and high-pressure compressors respectively). In particular, the following equalities are verified: $N1R=N1/\sqrt{T2}$ et $N2R=N2/\sqrt{T25}$.

This highly preferred embodiment of the present disclosure is very advantageous as it allows the flow rate of fuel that is injected into the combustion chamber to be regulated in a closed loop on the N2R/N1R ratio, and this in parallel with the regulations of the steps (i) and (ii). It is thus possible to vary this fuel flow rate to maintain the aforementioned N2R/N1R ratio, preferably in accordance with a steady regime selected in the step (0). The stabilisation and/or the control of this ratio through this closed loop plays an important role as it allows a stabilisation and/or a control of the operating point of the low-pressure compressor between its low efficiencies and its pumping line (and/or stalling), so as to optimise the efficiency of the latter taking into account its stability limits. Indeed, it is known to a person skilled in the art that this operating point is at the intersection, in the operating field of the low-pressure compressor (which comprises the coordinate points (flow rate, compression ratio)), of an iso-speed curve (obtained by the intrinsic characteristic of compression by flow rate at a given rotational speed of the low-pressure compressor), and an operating line corresponding to an inlet flow rate of the high-pressure compressor at that operating point (which depends mainly on the speed N2 as well as on the pitch setting of the vanes of the variable pitch setting straighteners of the high-pressure compressor). Therefore, a misalignment between the speeds of the low and high-pressure compressors with respect to the alignment for which the turbomachine was designed, may offset the operating point of the low-pressure compressor. The resulting offset is likely to steer the low-pressure compressor towards low efficiencies (e.g. if the N2/N1 ratio is greater than expected), or towards a potentially destructive instability, close to or on a line of the operating field referred to as "for pumping" (or "stalling") comprising points at which the efficiency of the low-pressure compressor drops as a result of an aerodynamic stall of the vanes (e.g. if N2/N1 is smaller than expected). Such a misalignment is in particular likely to occur following the steps (i) and (ii) as will be explained below with reference to FIGS. 3 and 4, hence the importance of this closed loop provided in the step (iii). This allows for a stability and/or a control of the low-pressure compressor operating point at the best compromise of efficiency and stability. In the same way as for the step (ii), it is implicit that this closed loop regulation requires a regular measurement of the above-mentioned parameters N1, T2, N2, T25, preferably in order to ensure a compliance of the N2R/N1R ratio with the steady regime selected in the step (0). It should be noted that the techniques for measuring these parameters, for example, by means of dedicated sensors, are widely known to a person skilled in the art.

According to a preferred embodiment of the disclosure, the flow rate of fuel injected into the combustion chamber is regulated in the step (iii) so that this ratio corresponds to a second mathematical function of the pitch setting of vanes of the straightener, the second function depending on the steady regime selected in the step (0). In other words, each steady regime is previously associated with such a second function on the basis of which the injected fuel flow rate and the N2R/N1R ratio will be regulated in a closed loop. Preferably, for each such steady regime, this second function is a constant or essentially constant function so that the step (iii) allows to maintain an N2R/N1R ratio as constant or essentially constant, which advantageously allows to stabilize the operating point of the low-pressure compressor close to its maximum efficiencies without negatively impacting the efficiency of the regulation of the thrust. In this case, the N2R/N1R ratio (corresponding to the choice of a second function) is preferably determined beforehand for each steady regime that can be selected in the step (0). Alternatively, and without departing from the scope of the disclosure, for each steady regime, the second function may be chosen as a bijective, preferably affine monotonic function of the form $f(\theta)=c\theta+d$ for (c, d) a pair of coefficients which is preferably determined beforehand for each steady regime. In combination, it can be envisaged that some steady regimes are associated with a second bijective, preferably affine, monotonic function and other steady regimes with a second constant or essentially constant function. Optionally, the choice of such a second function type for a steady regime is independent of the choice of such a first function type for that same steady regime.

The method according to the disclosure is also applicable to an aircraft turbomachine comprising a plurality of propellers equipped with blades, each associated with a blade variable pitch setting system for varying the pitch of its blades. In this case, preferably, the step (ii) is applied for each of the propellers by means of its associated blade variable pitch setting system. The parameters taken into account for this purpose may be different (e.g. in the case of counter-rotating propellers).

It is a further object of this disclosure to provide a system for regulating the thrust of high bypass ratio aircraft turbomachines, which allows such a regulation to be sufficiently accurate and efficient. For this purpose, the disclosure proposes a system for regulating the thrust of an aircraft turbomachine, comprising means for implementing the method according to the disclosure. The embodiments and the advantages of the method according to the disclosure and of these embodiments are mutatis mutandis applicable to the above-mentioned regulation system. The latter thus reaches in particular the other object of the disclosure.

In other words, the regulation system according to the disclosure comprises technical means for implementing the steps (i) and (ii) of the regulation method according to the disclosure, and means for implementing the step (iii) of this same method when it comprises them. These technical means are preferably already present within the aircraft turbomachine and/or the aircraft as a whole. The following paragraphs mention non-limiting examples of such means and their preferred application for a selected steady regime.

Preferably, the technical means for implementing the step (i) comprises a first control unit configured to be coupled to a thrust lever of the turbomachine and to the vane variable pitch setting system for varying the pitch of vanes of the straightener to control an adjustment of the pitch setting of the vanes in response to an action on the thrust lever.

Preferably, the technical means for implementing the step (ii) comprise:
measuring means configured to determine a rotational speed and a pitch setting of the blades of the propeller, and preferably a pitch setting of the vanes of the straightener;
a first logic unit coupled to these measuring means for:
receiving measurements from them,
determining a possible adjustment of the pitch setting of the blades of the propeller on the basis of these measurements;
a second control unit coupled to the first logic unit and configured to be coupled to the blade variable pitch setting system for varying the pitch of blades of the propeller and to control the eventual adjustment of the pitch setting of the blades of the propeller.

It should be noted that the blade variable pitch setting systems for a propeller are widely known to a person skilled in the art. Preferably, the first logic unit is also configured to:
performing a comparison between the measurement of the rotational speed of the propeller and a rotational speed associated to the steady regime (and preferably on the basis of a first function as introduced above),
and determining whether the pitch setting of the blades of the propeller should be adjusted by the first logic unit is preferably made on the basis of this comparison and the pitch setting measurement of the blades of the propeller.

Preferably, the technical means for implementing the step (iii) comprise:
measuring means configured to determine a rotational speed (N1, N2) and an inlet temperature (T2, T25) of each of the low and high-pressure compressors, as well as a measurement of the flow rate of fuel injected into the combustion chamber, and preferably, a pitch setting of the vanes of the straightener;
a second logic unit coupled to these measuring means for:
receiving measurements of these and calculating the N2R/N1R ratio,
performing a comparison between the calculated N2R/N1R ratio and this same ratio associated with the steady regime (and preferably on the basis of a second function as introduced above),
determining a possible adjustment of the fuel flow rate to be injected into the combustion chamber on the basis of this comparison and the measurement of this flow rate;
a third control unit coupled to the second logic unit and configured to be coupled to a fuel injector in the combustion chamber and to control the possible adjustment of the fuel flow rate.

More generally, the steps (i), (ii) and (iii) of the method can be implemented in dedicated hardware circuits and/or via software tools known to a person skilled in the art. Very advantageously, in the above preferred examples, the system according to the disclosure takes full advantage of the already existing infrastructures (dedicated or not) such as the FADEC, the thrust lever or even sensors for measuring rotational speeds and temperatures at the level of the low and high-pressure compressors, and this without the need for costly and complex modifications to the aircraft turbomachine.

The disclosure also proposes an aircraft turbomachine equipped with the regulation system according to the disclosure. In particular, this turbomachine has a preferred bypass ratio of at least 20, optionally at least 30. It comprises:
- (at least) one propeller comprising a plurality of blades, a blade variable pitch setting system;
- successively along an engine axle of the turbomachine:
  - a low-pressure compressor comprising at least one straightener equipped with a vane variable pitch setting system configured to change an orientation of vanes of the straightener,
  - a high-pressure compressor,
  - a combustion chamber,
  - at least one turbine, preferably a low-pressure turbine and a high-pressure turbine.

This aircraft turbomachine has a preferred bypass ratio of at least 20, optionally at least 30. Preferably, the propeller and the low-pressure compressor are connected by means of a reducer, so that the rotational speeds of the propeller and the low-pressure compressor are proportional. Preferably, the reducer is such that the ratio of these speeds is variable and/or controllable.

In the preferred case of the aforementioned technical means for implementing the steps (i), (ii) and/or (iii), respectively, and effectively, the first control unit is coupled to the thrust lever of the turbomachine and to the vane variable pitch setting system of the straightener, the second control unit is coupled to the blade variable pitch setting system for varying the pitch of blades of the propeller, and/or the third control unit is coupled to the fuel injector.

All the embodiments of the regulation system according to the disclosure and their advantages apply mutatis mutandis to the present turbomachine. Preferably, it consists of one of:
- a double-flow turbojet engine with a ducted propeller;
- an open-rotor thruster, the propeller being un-ducted.

These propellers are preferably fast in the sense that they can reach speeds of the order of 0.8 Mach. For example, such a double-flow turbojet engine is a UHBR turbojet engine and such an open rotor thruster is a CROR thruster. These examples are presented in FIGS. 1 and 2 below.

DESCRIPTION OF THE DRAWINGS

Further characteristics and advantages of the present disclosure will become apparent from the following detailed description, for the understanding of which reference is made to the attached figures, among which.

The drawings in the figures are not to scale. Generally, similar elements are denoted by similar references in the figures. In the scope of this document, the same or similar elements may have the same references. Furthermore, the presence of reference numbers or letters in the drawings cannot be considered as limiting, even when these numbers or letters are indicated in the claims.

DETAILED DESCRIPTION

In the case of this document, "a propeller of an aircraft turbomachine" refers to both a ducted propeller and an un-ducted propeller. As previously noted, a large, variable pitch setting "fan" is currently considered as a "ducted propeller". This portion of the text provides a detailed description of preferred embodiments of the present disclosure. The latter is described with particular embodiments and references to figures but the disclosure is not limited by them. The drawings and/or figures described below are schematic only and are not limiting.

Figure 1:
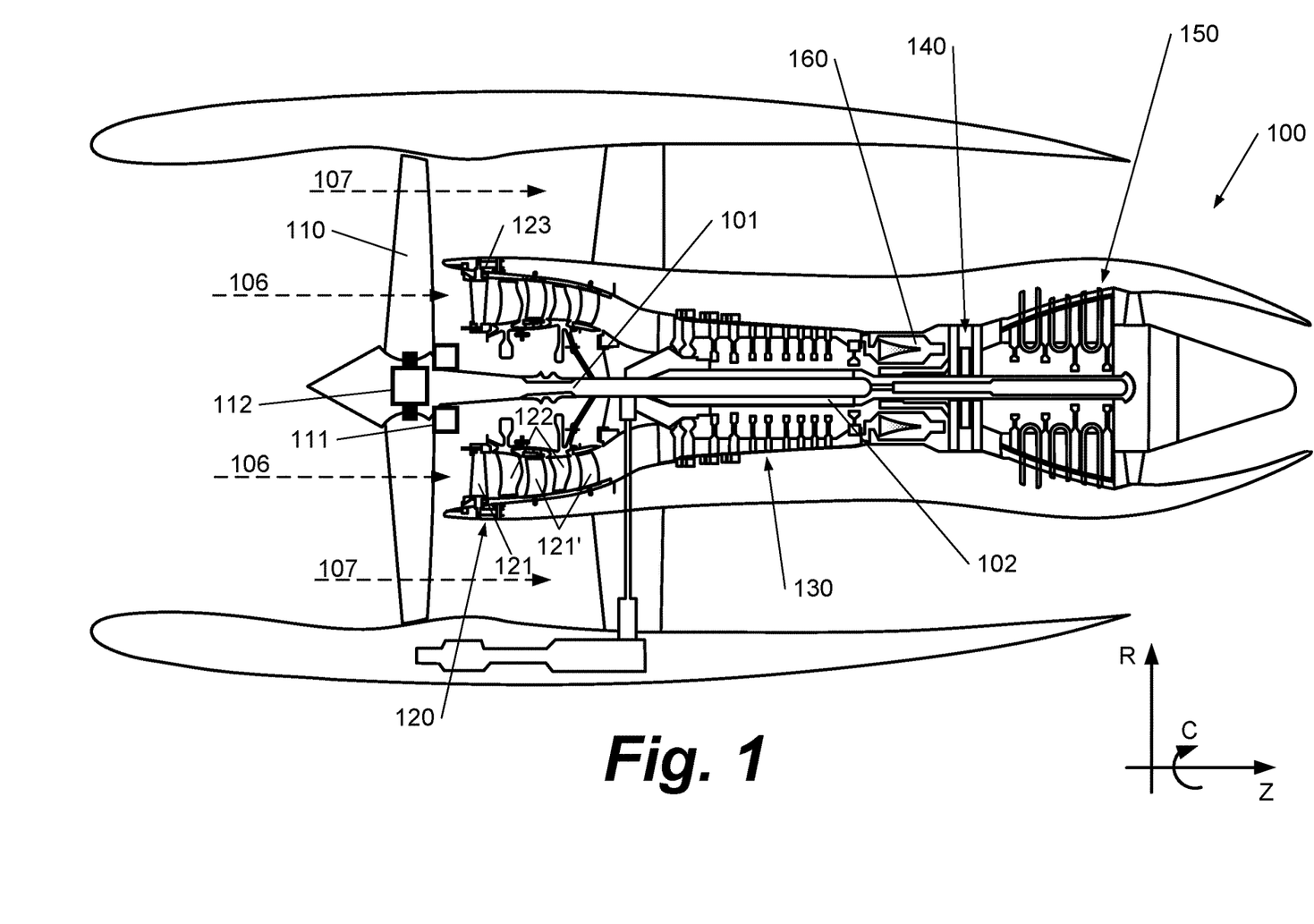
FIGS. 1 and 2 illustrate a simplified schematic view of a two-dimensional cross-section of a preferred embodiment of an aircraft turbomachine on which it is intended to integrate the regulation system according to the disclosure.
Figure 2:
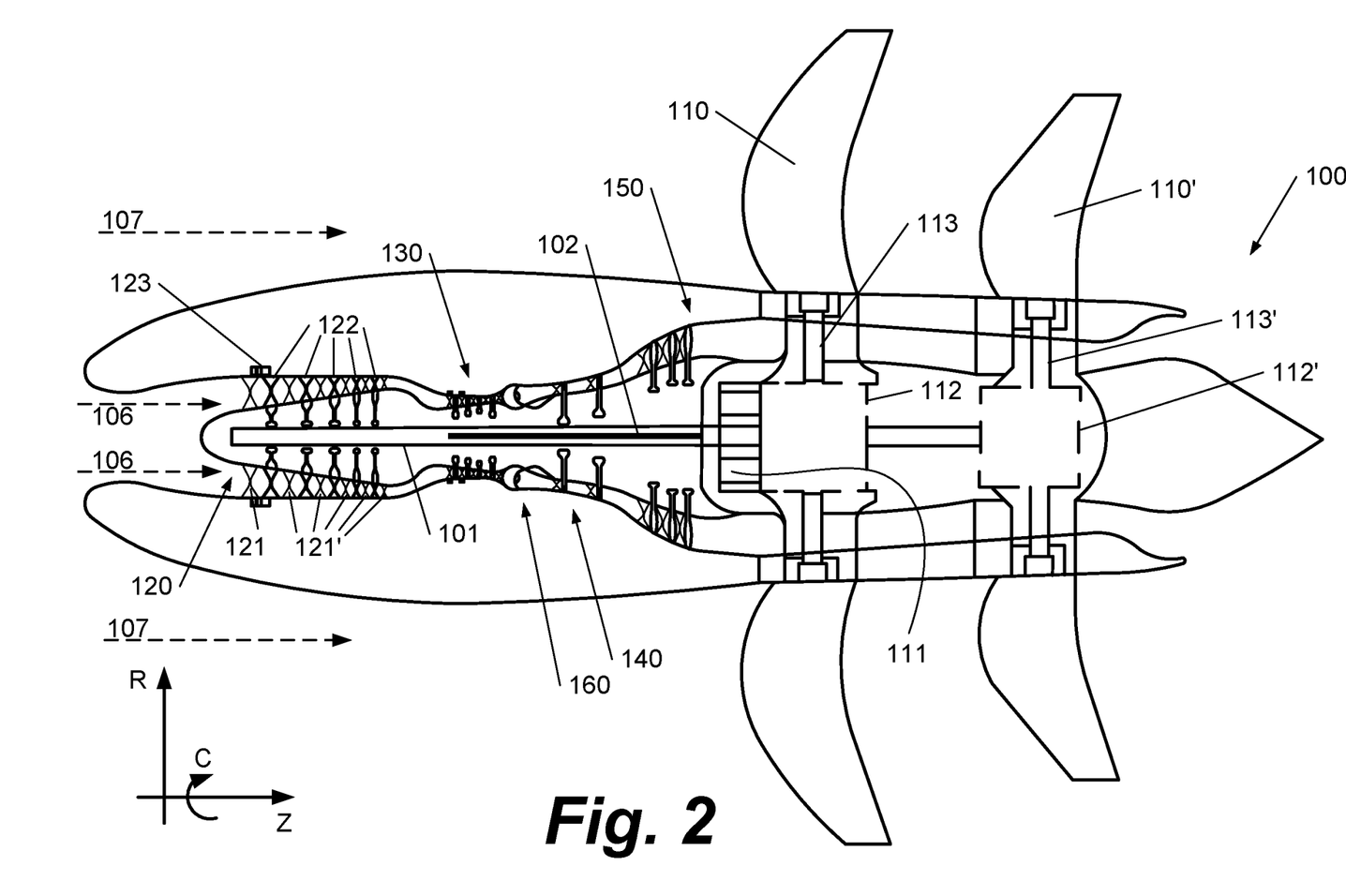

References are shown in some of these figures as abstract geometrical reference frames primarily to quantify and/or visualize properties of embodiments of the disclosure. The reference Z is, for example, usually the "engine axle" of the aircraft turbomachine. This is directed from "upstream" to "downstream". The stages of the compressors and the turbines of the aircraft turbomachine are stacked essentially along this engine axle. The terms "inlet" and "outlet" of a compressor refer to the upstream and downstream ends of the compressor respectively. In the context of this document, reference is made to the "axial", "circumferential" and "radial" directions, which correspond preferentially and respectively to directions parallel to the engine axle, essentially circular around the engine axle, and direction perpendicular to the engine axle. Reference frames in FIGS. 1 and 2 illustrate these directions (equipped with an orientation) noted as Z, R and C respectively. The direction and the orientation of the engine axle and the vector Z correspond. The terms "axially" and "radially" are derived from the terms "axial" and "radial" respectively with a similar preferred meaning. The terms "circumferential" and "radial" preferably refer to a polar coordinate system known to a person skilled in the art in each plane perpendicular to the engine axle.

FIGS. 1 and 2 illustrate cross-sections of two axial aircraft turbomachines 100 on which it is intended to regulate the thrust by the method according to the present disclosure. Each of these turbomachines 100 comprises a propeller 110 equipped with a plurality of blades, associated with a blade variable pitch setting system 112 for varying the pitch of the blades, and successively along the engine axle (parallel to the axis Z), a low-pressure compressor 120, a high-pressure compressor 130, a combustion chamber 160, a high-pressure turbine 140 and a low-pressure turbine 150. These elements are known to a person skilled in the art. In operation, the mechanical power of the low-pressure 150 and high-pressure 140 turbines is transmitted by means of the low-pressure 101 and high-pressure 102 shafts to the low-pressure 120 and high-pressure 130 compressors respectively, as well as to the propeller 110 via the low-pressure 101 shaft by means of an interposed reducer 111, so that the rotational speeds of the propeller 110 and the low-pressure 120 compressor are proportional. Although not systematically referenced in FIGS. 1 and 2, each compressor 120, 130 and each turbine 140, 150 comprises at least one stage, each such stage comprising a stationary blading and a movable blading adapted to be rotated about the engine axle. For the low-pressure compressor 120, these stationary and movable bladings are denoted 121-121' and 122 respectively. The stationary bladings of the compressors 120, 130 are generally referred to as "straighteners". The movable and stationary bladings of the stages of such a compressor 120, 130 are alternated along the engine axle. Parameters such as the dimensions and the surface geometry of the vanes are determined so that the operating conditions of each stage are adapted to those of the upstream and/or downstream stages along the engine axle. In particular, the movable bladings provide an energy by increasing the relative speed of the flowing of an air flow passing through the compressor 120, 130, while the straighteners bring the flowing back parallel to the engine axle while increasing the pressure and decreasing the absolute speed of the flowing. Each stationary vane has a given aerodynamic profile and a pitch setting angle relative to the engine axle to impose a flowing orientation. The low-pressure 120 and high-pressure 130 compressors thus allow to synergistically suck in and compress air so as to bring it to suitable speed, pressure and temperature adapted at the inlet of the combustion chamber 160. These concepts are known to a person skilled in the art. One or more of the straighteners of the compressors 120, 130 are equipped with a vane variable pitch setting system for varying the pitch of their vanes to optimise the flowing of the air flow between stages of these compressors 120, 130. Similarly, the blade variable pitch setting system 112 for varying the pitch of blades coupled to the propeller 110 allows the orientation of the profile of the blades and therefore the pitch of this propeller 110 to be modified, in order to obtain good operation of the aircraft turbomachine 100 according to the different phases of flight encountered. As is well known to a person skilled in the art, each of the above-mentioned vane variable pitch setting systems for varying vanes of straighteners preferably comprises an annulus (referred to as "VSV") mechanically coupled to the vanes and adjusted circumferentially and externally around an associated casing of the compressor 120, 130, and a displacement unit, typically at least one jack, for displacing this annulus, and accordingly modifying in a synchronised manner the pitch setting of the vanes of the straightener. According to FIGS. 1 and 2, the low-pressure compressor 120 comprises at least one straightener 121 (hereinafter simply referred to as "the straightener 121") equipped with such a variable pitch setting system referenced by 123. This straightener 121 is preferably upstream of the low-pressure compressor 120. The representation in FIG. 1 is not limiting to the case where one or more of the other straighteners 121' is also equipped with such a variable pitch setting system. For each of the aircraft turbomachines 100 shown in FIGS. 1 and 2, a hot air flow, referred to as primary flow 106, passes through the aircraft turbomachine 100 axially, thereby feeding the combustion chamber 160, while a cold air flow, referred to as secondary flow 107, is primarily intended to generate a thrust reaction necessary for the flight of the aircraft. This secondary flow 107 is accelerated by the propeller 110 without passing through the combustion chamber 160. The ratio of the secondary 107 and main 106 mass flows is referred to as bypass ratio. In the case of the present disclosure, it is preferably equal to 20 or more because the propeller 110 is preferably large.

The propeller 110 of the aircraft turbomachine 100 shown in FIG. 1 is ducted and typically referred to as fan. It allows the generation of primary 106 and secondary 107 flows upstream of the low-pressure compressor 120. This aircraft turbomachine 100 is preferably a UHBR type turbojet engine.

The aircraft turbomachine 100 shown in FIG. 2 is a CROR thruster of the class of the "open rotor" thrusters. The propeller 110 is un-ducted. This thruster also comprises a second, un-ducted propeller 110' equipped with blades. In the scope of the embodiment, these propellers 110, 110' are counter-rotating. The case where one of these propellers 110, 110' is stationary is not excluded from the present disclosure. As these propellers are not ducted, they can be easily sized to accelerate a very large secondary mass flow 107. Each propeller 110, 110' is coupled to a blade variable pitch setting system 112, 112' for varying the pitch of its blades and to the low-pressure shaft 101 by substantially radially extending mechanical arms 113, 113'. The method according to the present disclosure is preferably applied to each of these propellers 110, 110' with its associated variable pitch setting 112, 112' of blades.

Figure 5:
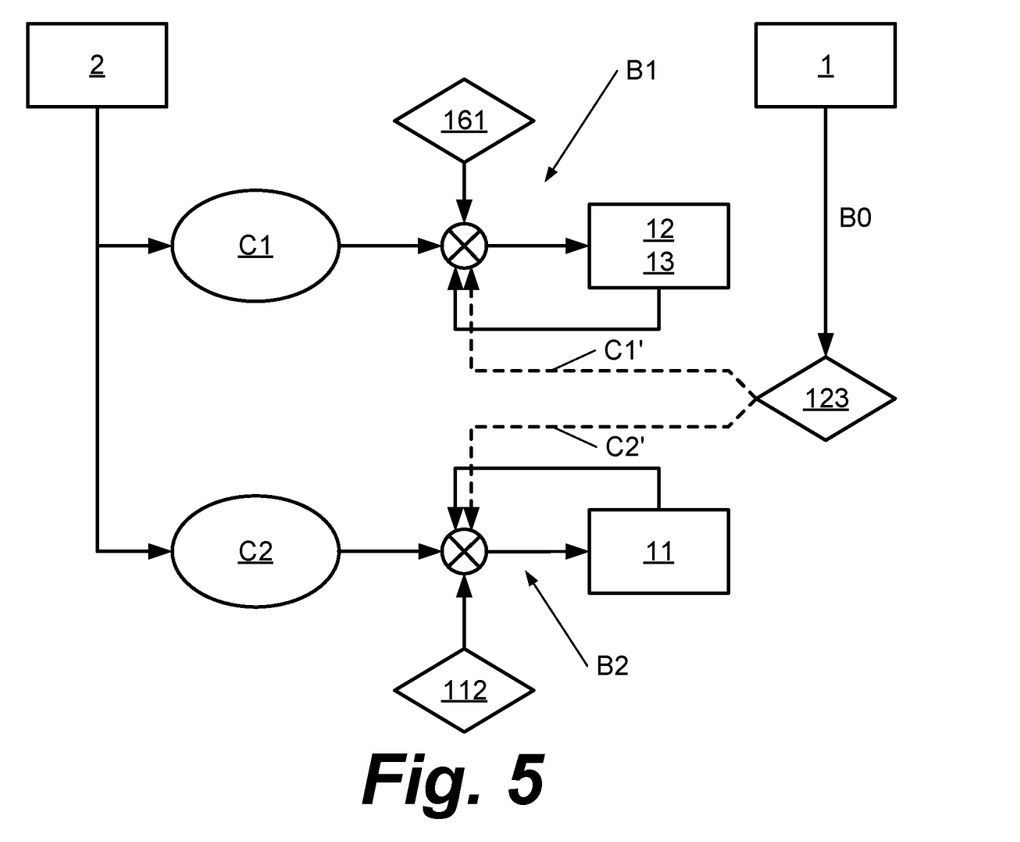
FIG. 5 illustrates schematically a preferred embodiment of the regulation method according to the disclosure.

The present disclosure proposes to regulate the thrust of aircraft turbomachines 100 as illustrated in FIGS. 1 and 2 by means of the regulation method according to the disclosure. This is illustrated in FIG. 5 and commented on below for a preferred execution in steady regime. The method can be implemented by a regulation system as introduced in the disclosure. In accordance with the steps (i) and (ii), the method proposes:
    an open loop B0 for regulating the thrust (directly operable by a thrust lever 1, e.g., by a pilot) by means of the vane variable pitch setting system 123 based on the pitch setting of the vanes of the straightener 121;
    a closed loop B2 for regulating the pitch setting of the blades of the propeller 110 by means of the blade variable pitch setting system 112 based on a rotational speed of the propeller 110.

This closed loop B2 is a function of the steady regime selected on the basis of the appropriate device 2 in the aircraft turbomachine, in the sense that this regime is preferably associated in advance with a rotational speed of the propeller 110 to be maintained as constant or close to constant. This defines a condition noted C2 for the closed loop B2. Typically, means 11 for measuring this rotational speed are provided. Optionally, this condition C2 is replaced and/or complemented (depending on the steady regime considered) by a condition C2' associated with the chosen steady regime and with a first monotonic and bijective function of the pitch setting of the vanes of the straightener 121 so as to impose a certain rotational speed of the propeller 110.

Very preferably, the method provides for a closed loop B1 to also regulate the flow rate of fuel injected into the combustion chamber 160 on the N2R/N1R ratio of the reduced rotational speeds of the high-pressure 130 and low-pressure 120 compressors. This closed loop B1 is a function of the steady regime selected on the basis of the appropriate device 2 in the aircraft turbomachine, in the sense that, preferably, this regime is previously associated with such a N2R/N1R ratio to be maintained as constant or close to constant. This defines a condition noted C1 regulating the closed loop B1. Typically, means 12, 13 for measuring the rotational speeds N1, N2, and the temperatures T2, T25 at the inlet of the low and high-pressure compressors 120 and 130 respectively are provided. Optionally, the condition C1 is replaced and/or supplemented (depending on the steady regime considered) by a condition C1' associated with the chosen steady regime and with a second monotonic and bijective function of the pitch setting of the vanes of the straightener 121 so as to impose a certain N2R/N1R ratio.

Figure 3:
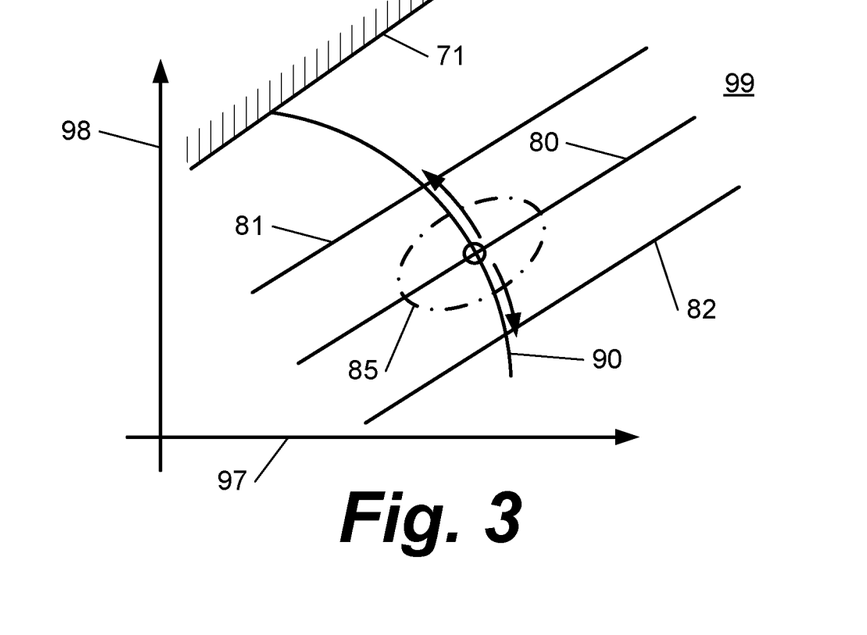
FIGS. 3 and 4 illustrate an operating field of a low-pressure compressor of an aircraft turbomachine.
Figure 4:
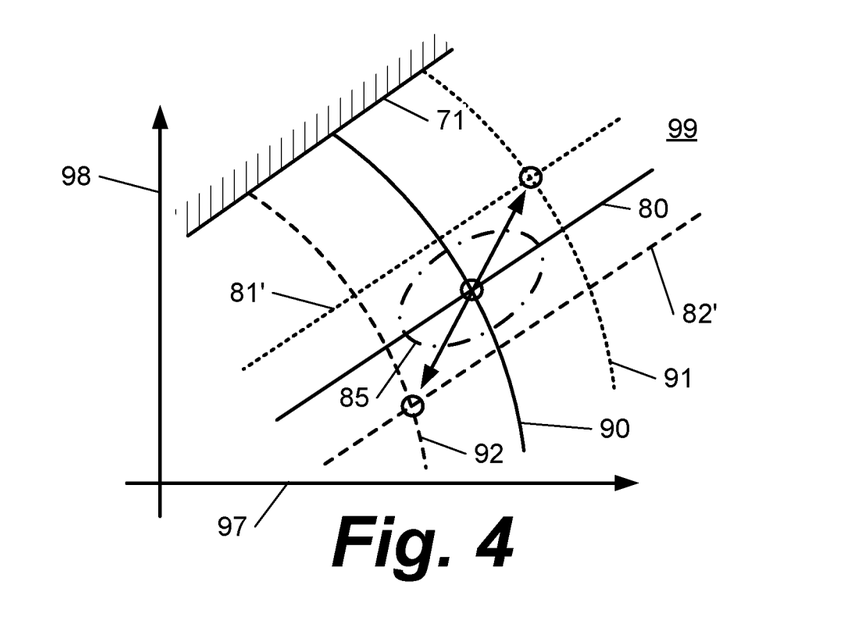

The above-mentioned closed loop B1 is the preferred step (iii) of the method according to the present disclosure. It allows the operating point of the low-pressure compressor 120 to be stabilised, or at least controlled, at the best compromise of efficiency and stability. Indeed, as illustrated in FIGS. 3 and 4 respectively, the steps (ii) and (i) of the method are likely to lead to a sliding of this operating point either towards low efficiencies or towards a certain instability. More specifically, each of these figures illustrates the operating field 99 of the low-pressure compressor 120, equipped with a reference frame of axis 97 and 98 corresponding respectively to the (optionally reduced) flow rate and the compression ratio of the low-pressure compressor 120. The pumping line 71 defines and/or estimates a stability limit of the latter. A margin (referred to as pumping margin) must be maintained between this pumping line 71 and the operating point of the low-pressure compressor 120, and in particular taken into account the uncertainties in measuring the operating parameters of the latter. A nominal and/or desired operating point is at the intersection of an iso-speed curve 90 and an operating line 80 corresponding to a flow rate at the inlet of the high-pressure compressor 130 (i.e., essentially a flow rate at the outlet of the low-pressure compressor 120). This operating point is located in an area 85 of optimum efficiency of the low-pressure compressor 120, at a sufficient margin from the pumping line 71.

FIG. 3 illustrates the impact that a variation in the pitch setting of blades of the propeller 110 is likely to have on the operating point of the low-pressure compressor 120 at the same rotational speed of the propeller 110. Such a variation changes the power requirement on the low-pressure shaft 101 of the aircraft turbomachine 100, and consequently the rotational speed of the high-pressure compressor 130. On the one hand, if the pitch setting of the blades of the propeller 110 opens from an initial position, the high-pressure compressor 130 is accelerated, resulting in a translation in the operating line of the low-pressure compressor 120 towards the line 82. The low-pressure compressor 120 then evolves towards lower efficiencies. On the other hand, if the pitch setting of the blades of the propeller 110 closes from this initial position, the high-pressure compressor 130 is slowed down, resulting in a translation in the operating line of the low-pressure compressor 120 towards the line 81. The low-pressure compressor 120 then evolves towards its stability limit.

FIG. 4 illustrates the impact of varying the pitch setting of the vanes of the straightener 121 on the operating point of the low-pressure compressor 120. In the same way as above, this variation affects the rotational speed of the high-pressure compressor 130. On the one hand, if the pitch setting of the vanes of the straightener 121 opens from an initial position so as to increase the air flow rate, the high-pressure compressor 130 is slowed down, which translates the operating point to the intersection of the operating line 81' and the iso-speed curve 91 (which corresponds to the same speed as the curve 90 for the above-mentioned pitch setting of the vanes of the straightener 121). The low-pressure compressor 120 then evolves towards its stability limit. On the other hand, if pitch setting of the vanes of the straightener 121 closes from this initial position so as to decrease the air flow rate, the high-pressure compressor 130 is accelerated, which translates the operating point to the intersection of the operating line 82' and the iso-speed curve 92 (which corresponds to the same speed as the curve 90 for the above-mentioned pitch setting of the vanes of the straightener 121). The low-pressure compressor 120 then evolves towards lower efficiencies.

In summary, the present disclosure relates to a method and a system for regulating the thrust of a high bypass ratio aircraft turbomachine 100, preferably at steady regime, by a direct action on a vane variable pitch setting system 123 for varying the pitch of vanes of a straightener 121 of a low-pressure compressor 120.

The present disclosure has been described above in connection with specific embodiments, which are illustrative and should not be considered limiting. In general, it will be apparent to a person skilled in the art that the present disclosure is not limited to the examples illustrated and/or described above.

The invention claimed is:

1. A method for regulating the thrust of an aircraft turbomachine, the aircraft turbomachine comprising:
   a propeller comprising a plurality of blades, the blades being configured to have selectively variable pitch;
   components arranged successively along an engine axis, including:
   a low-pressure compressor comprising at least one straightener equipped with vanes configured to have selectively variable pitch,
   a high-pressure compressor,
   a combustion chamber, and
   one or more turbines;
   the method comprising the steps of:
   (0) selecting a steady regime for the aircraft turbomachine:
   (i) varying the pitch of said vanes of the at least one straightener to regulate in an open loop the thrust of the turbomachine; and
   (ii) regulating the pitch of said plurality of blades of the propeller in a closed loop based on a rotational speed of the propeller and on the steady regime selected at step (0) so that the rotational speed of the propeller corresponds to a first mathematical function of the pitch of said vanes of the at least one straightener, the first mathematical function depending on the steady regime selected at step (0).

2. The method according to claim 1, wherein the first mathematical function is a constant function or a bijective monotonic function.

3. The method according to claim 1, further comprising the step of:
   (iii) regulating a fuel flow rate injected into the combustion chamber in a closed loop based on a ratio of reduced rotational speeds of the high-pressure and low-pressure compressors.

4. The method according to claim 3,
   wherein the flow rate of fuel injected into the combustion chamber is regulated at step (iii) on a basis of the steady regime selected at step (0).

5. The method according to claim 1, wherein the aircraft turbomachine is of a bypass ratio of at least 20.

6. The method according to claim 1, wherein the aircraft turbomachine comprises a plurality of propellers equipped with blades, the blades being configured to have selectively variable pitch, and in that the step (ii) applies for each of the propellers.

7. A method for regulating the thrust of an aircraft turbomachine, the aircraft turbomachine comprising:
   a propeller comprising a plurality of blades, the blades being configured to have selectively variable pitch;
   components arranged successively along an engine axis, including:
   a low-pressure compressor comprising at least one straightener equipped with vanes configured to have selectively variable pitch,
   a high-pressure compressor,
   a combustion chamber, and
   one or more turbines;
   the method comprising the steps of:

(0) selecting a steady regime for the aircraft turbomachine,
(i) varying the pitch of said vanes of the at least one straightener to regulate in an open loop the thrust of the turbomachine;
(ii) regulating the pitch of said plurality of blades of the propeller in a closed loop based on a rotational speed of the propeller and on the steady regime selected at step (0); and
(iii) regulating a fuel flow rate injected into the combustion chamber in a closed loop based on a ratio of reduced rotational speeds of the high-pressure and low-pressure compressors and on the steady regime selected at step (0);
wherein the flow rate of fuel injected into the combustion chamber is regulated at step (iii) so that said ratio corresponds to a second mathematical function of the pitch of said vanes of the at least one straightener, the second function depending on the steady regime selected at step (0).

8. The method according to claim 7, wherein the second function is a substantially constant function or a bijective monotonic function.

* * * * *